(12) United States Patent
Monson et al.

(10) Patent No.: US 6,752,089 B2
(45) Date of Patent: Jun. 22, 2004

(54) PALLET ELASTOMER MOUNT

(75) Inventors: Robert James Monson, St. Paul, MN (US); Trevor J. McCollough, Minneapolis, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 141 days.

(21) Appl. No.: 09/992,913

(22) Filed: Nov. 19, 2001

(65) Prior Publication Data
US 2003/0093887 A1 May 22, 2003

(51) Int. Cl.$^7$ .............. B65D 19/38; B23P 21/00
(52) U.S. Cl. ................. 108/57.26; 29/799
(58) Field of Search .............. 29/428, 433, 434, 29/799; 108/901, 57.1, 57.25, 57.26, 57.33

(56) References Cited

U.S. PATENT DOCUMENTS 3,026,544 A * 3/1962 Persicke et al. ............ 428/101
5,076,176 A * 12/1991 Clasen ........................ 601/2

* cited by examiner

Primary Examiner—John C. Hong

(57) ABSTRACT

A pallet type mount wherein a pair of rigid members each having extensions that spacedly mesh with each other and an elastomer member secured between the rigid members so that when a compressive force is applied to the rigid members the pallet type mount provides compressive force for a load thereon while absorbing shock and vibration energy through tension forces on the elastomer member.

11 Claims, 1 Drawing Sheet

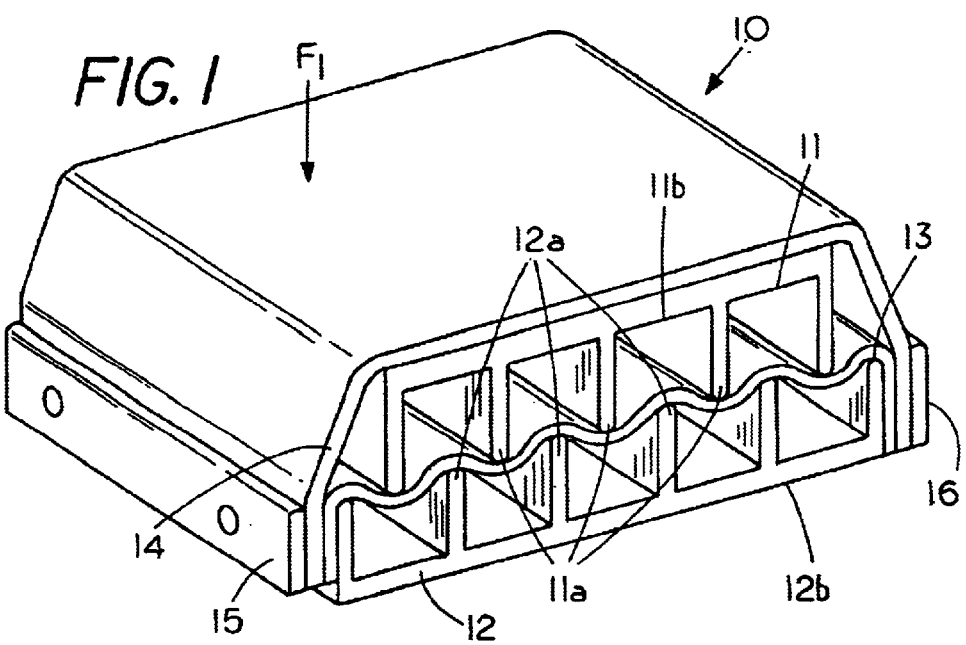
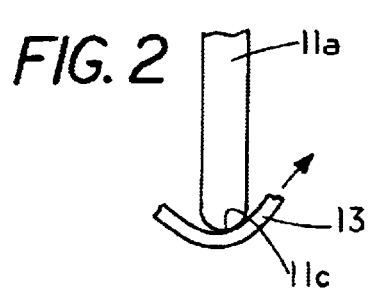
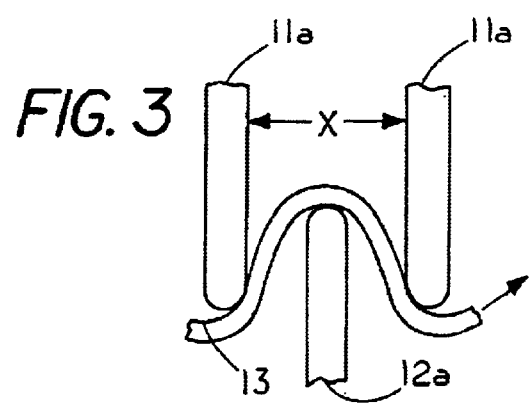
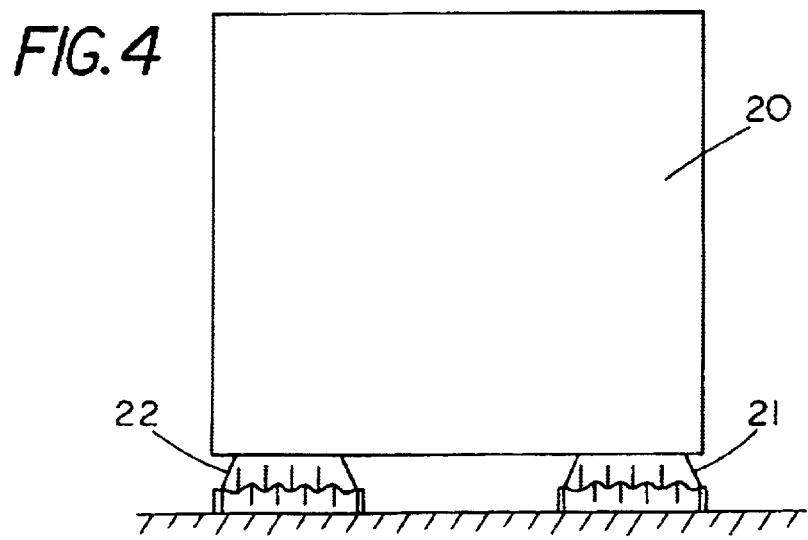

PALLET ELASTOMER MOUNT

FIELD OF THE INVENTION

This invention relates generally to pallet mounts and more specifically a pallet mount that provides compressive support while absorbing shock and vibration through tensioning of an elastomer member.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Various types of mounts are needed to absorb shock and vibration. In certain applications, such as applications beneath a cabinet or the like or in mounting equipment where little clearance is available it is necessary to use compressive loading. The present invention allows one to place a compressive load on a pallet like mount but still allows one to utilize the characteristics of a tension style mount to absorb the shock and vibration energy. The pallet type mounts of the present invention can be placed under the entire cabinet or at corner locations to provide compressive support for the static weight of the equipment and at the same time present tensionally resistance to shock and vibration forces to the equipment.

SUMMARY OF THE INVENTION

The invention comprises a pallet type mount wherein a pair of rigid members each having extensions that spacingly mesh with each other and an elastomer member transversly secured between rigid members so that when a load is placed on the rigid members the pallet type mount provides compressive resistance to support the weight of the a load thereon while absorbing shock and vibration energy through tension forces on the elastomer member stretched between the two rigid members.

BRIEF DESCRIPTION OF THE DRAWINGS

FIG. 1 is a perspective view of a pallet elastomer mount of the present invention.

FIG. 2 shows a partial view of a protrusion and a portion of an elastomer that is in engagement with the end of the protrusion;

FIG. 3 shows a partial view of protrusions of rigid members and the spacing therebetween; and FIG. 4 shows a front view of pallet elastomer mounts supporting an equipment cabinet.

DESCRIPTION OF THE PREFERRED EMBODIMENT

FIG. 1 is a perspective view of a pallet elastomer mount 10 having a first rigid member 11 having a set of parallel extending protrusions 11a extending outwardly and substantially perpendicular from a base 12. Similarly, a second rigid member 12 having a set of parallel extending protrusions 12a extending outwardly and substantially perpendicular from a base 12b. Each of the protrusions 11a are spaced from each other so that the protrusions 11a of rigid member 11 bisect the space region between the protrusions of rigid member 12 and vice versa. The use of multiple extending protrusions allows one to provide a stable platform by distributing a compressive load over an extended area thereby avoiding tipping or sliding. The spacing of the extensions of each of the rigid members is such that the extensions on each of the rigid members spacedly mesh with the extensions on the opposed rigid member yet permit lateral and transverse displacement of each rigid member with respect to the other rigid member.

Extending transversely between the ends of rigid member 11 and rigid member 12 is an elastomer member 13 that has a first end secured to rigid member 12 by a first strip 15 and a second end secured to rigid member 12 by a second strip 16. The securing of the ends of elastomer member 13 causes the elastomer member 13 to tensionally resist a compressive force $F_1$. In the embodiment shown the ends of protrusions are not secured to elastomer member 13 so that the elastomer can contract over its entire length. In order to provide for the elongation of the elastomer and the subsequent flow of the elastomer over the ends of the protrusion the protrusions are provided with rounded edges as shown in FIG. 2. FIG. 2 shows that the rounded end 11c allows elastomer 13 to slide smoothly therepast without rupturing the elastomer member 13. While elastomer member 13 is shown to comprise a sheet other configurations of elastomer member could be used. For example, elongated strips of elastomers or multiple layers of elastomers. Thus the elastomer member 13 extending between plurality of protrusions 11a of first rigid member 11 and the plurality of protrusions 12a of second rigid member 12 yieldable limit the meshable engagement between the first rigid member 11 and the second rigid member 12 as a compressive force is applied to the rigid members. Typical elastomers suitable in the present invention are rubber or the like.

In order to maintain rigid member 11 proximate rigid member 12 a further member 14 has one end secured to one side of rigid member 12 and the other end secured to the opposite side of rigid member 12. Further member 14 limits the amount of permissible separation of members 11 and 12. In the embodiment shown the member 14 exerts sufficient force so as to produce a wave like appearance in the elastomer member 13. If desired further member 14 could comprise an elastomer member; however, since the purpose of further member 14 is to maintain the first rigid member 11 and the second rigid member 12 in proximate postion to each other a flexible but non-elastomer material could be used.

In the embodiment shown each of the protrusions or extensions comprise rigid parallel members; however, a set of members having a circular or other shape could also be used as long as the members can spacedly mesh with each other. By mesh with each other it is meant that the protrusions of one rigid member can be extended into the space between the protrusions of another rigid member yet leave enough space therearound for free movement of the elastomer past the end of the protrusions.

FIG. 3 illustrates how protrusions 11a form sufficient space therebetween so that the protrusion 12a can extended in a spacingly meshing relationship without contactiong each other. That is, in order for the extension or the protrusion 12a into the space between the protrusions of adjacent members 11a one needs to have the spacing sufficiently large between adjacent members 11a to accommodate the width of protrusion 12a, twice the thickness of the elastomer member 13 as it extends down along one side of the protrusion and upward along the opposite side of the protrusion as well as a free distance to allow lateral displacement of protrusions 12a without engagement of adjacent members 11a. The separation distance is identified by the dimension x and is sufficiently large to permits the elastomer 13 to tensionally flow over the ends of the protrusions without having the sides of the protrusions either bind or frictionally hinder the elongation or contraction of elastomer member 13. In addition, the separation distance x should be sufficiently large so as to permit side to side displacement of the protrusions with respect to one another to thus absorb lateral energy as well as shock and vibration along the compressive axis of the mount. It will be understood that the separation distance can depend on various factors such as the amplitude of the anticipated shock to be absorbed by the pallet mount.

While the embodiments shown each show a set parallel extending members or protrusions one can also obtain excellent shock and vibration damping by use of circular protrusions that are spacedly mesh with each other. A still further variation is the use of circular concentric projections that spacedly mesh. With the use of circular protrusions or circular concentric projections one can provide equal tensional resistant along both lateral directions of the pallet mount.

Thus the present invention also provides a method of absorbing shock and vibration in a compressive mode by 1. forming a first rigid member having a plurality of extensions extending outwardly therefrom. 2. forming a second rigid member having a plurality of extensions extending outwardly therefrom 3 extending an elastomer between the plurality of extensions of the first member and the second member; and 4. securing an end of the elastomer and an opposite end of the elastomer between the rigid members so that when the first rigid member and the second rigid member are brought in to meshable engagement with each other the elastomer member yieldable stretches to absorb shock and vibration forces to either of the first rigid member or the second rigid member.

We claim:

1. A pallet elastomer mount comprising:
   a first rigid member, said first rigid member having a plurality of protrusions extending outward therefrom to form a plurality of spaced regions therebetween;
   a second rigid member, said second rigid member having a plurality of protrusions extending outward therefrom to form a plurality of spaced regions therebetween with said plurality of protrusions of said first rigid member spacedly meshable with said plurality of protrusions of said second rigid member; and
   an elastomer member, said elastomer member extending between said plurality of protrusions of said first rigid member and said plurality of protrusions of said second rigid member to yieldable limit a meshable engagement between said first rigid member and said second rigid member through a tension resistance by the stretching of said elastomer member as a compressive force is applied to said rigid members.

2. The pallet elastomer mount of claim 1 wherein the plurality of protrusions on said first rigid member comprise a set of elongated members and the plurality of protrusions on said second rigid member comprise a set of elongated members.

3. The pallet elastomer mount of claim 2 wherein the elastomer member comprises a sheet of elastomer.

4. The pallet elastomer mount of claim 3 including a restraining member for maintaining the first rigid member and the second rigid member in meshable engagement when the elastomer member is located therebetween.

5. The pallet elastomer mount of claim 4 wherein the restraining member comprise an elastomeric material.

6. The pallet elastomer mount of claim 5 wherein a first end of the elastomeric material is secured to a first side of said first rigid member and a second end of the elastomeric material is secured to a second side of said first rigid member.

7. The pallet elastomer mount of claim 6 wherein the first rigid member and the second rigid member are substantially identical.

8. The pallet elastomer mount of claim 7 wherein the protrusions of the first rigid member each bisect a region between a pair of adjacent protrusion on said second rigid member.

9. The pallet elastomer mount of claim 1 wherein the protrusions comprise a set of rods.

10. The pallet elastomer mount of claim 1 including at least two pallet elastomer mounts spaced from each other to form separate shock and vibration mounts for a compressive load.

11. The pallet elastomer mount of claim 1 wherein the protrusion of the first rigid member are parallel to each other and extend outwardly at substantially a right angle from said first rigid member.

* * * * *